United States Patent Office 3,134,779
Patented May 26, 1964

3,134,779
SULFOLANYL SUBSTITUTED BARBITURATES
Herman E. Faith, Indianapolis, Ind., assignor to The Dow Chemical Company, Midland, Mich., a corporation of Delaware
No Drawing. Filed Sept. 10, 1962, Ser. No. 222,671
4 Claims. (Cl. 260—257)

The invention relates to novel organic compounds and more particularly relates to barbituric acids having as a substituent, at the 5 position, the 3-sulfolanyl group with or without a lower alkyl or phenyl substituent at the 5 position.

The 3-sulfolanyl group is illustrated as follows:

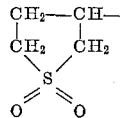

The present compounds may be illustrated by the following structural formula:

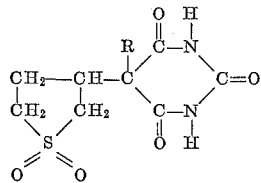

where R=H, phenyl, or lower alkyl group having 1–4 carbon atoms.

The compounds of the invention are crystalline solids which exhibit rather limited solubility in water and most organic solvents. Solubility is somewhat greater in dilute aqueous sodium hydroxide solution.

These substituted barbituric acids are adapted to be employed as active toxicants in compositions for the control of internal parasites in warm blooded animals, especially the helminths which invade the intestinal tract.

The compounds of the invention may be prepared by the condensation of urea with diethyl 3-sulfolanylmalonate, or with a diethyl α-alkyl (or α-phenyl)-3-sulfolanylmalonate.

Reaction is generally brought about by heating the reactants in absolute ethanol and in the presence of sodium ethoxide at reflux temperature for several hours. Generally, it is desirable to employ 2 equivalents of urea and 2 equivalents of sodium ethoxide, per equivalent of malonic ester, though other proportions may be used, if desired.

Upon completion of the reaction, the reaction mixture is filtered and the residue is washed with water to take up unreacted urea and malonic ester. Then the barbituric acid product is taken up in either warm water or hot ethyl acetate and allowed to recrystallize.

The malonate esters described may be prepared in the manner set forth in my copending application Serial No. 222,673, filed September 10, 1962 and entitled "Sulfolanylalkanoic Acids and Esters Thereof." According to the said application, diethyl malonate, or an appropriate α-monosubstituted diethyl malonate is alkylated with 3-bromosulfolane. Or, alternatively, as in the case of the α-phenyl substituted compound, diethyl α-phenyl-malonate is added across the double bond of either α-sulfolene or β-sulfolene to obtain diethyl α-phenyl-3-sulfolanylmalonate.

The following examples serve to illustrate the invention and are not to be construed as limiting.

EXAMPLE 1

5-(3-Sulfolanyl)barbituric Acid

A portion of diethyl 3-sulfolanylmalonate (9 grams; 0.0323 moles) in 50 milliliters of absolute ethanol medium was heated at the reflux temperature for 6.5 hours with about 0.065 moles of each of urea and sodium ethoxide. At the end of the reaction period, the reaction mixture was allowed to cool. The reaction mixture was filtered and the solid salt was washed with absolute ethanol (room temperature). This sodio compound was dissolved in water and acidified to yield 5-(3-sulfolanyl)barbituric acid. It was dissolved in boiling water, chilled, and acidified with dilute hydrochloric acid to yield 5.9 grams of compound which had a melting point of 280° C.

EXAMPLE 2

5-Ethyl-5-(3-Sulfolanyl)barbituric Acid

A 12.5-gram portion of diethyl α-ethyl-3-sulfolanylmalonate in 65 milliliters of absolute ethanol was heated at the reflux temperature for 10 hours with an equimolar proportion of sodium ethoxide and with twice the equimolar proportion of urea. At the end of the reaction period, the reaction mixture was worked up in the same manner as that described in Example 1. The purified barbituric acid product exhibited a melting range of 322–324° C. and was obtained in 51 percent yield.

EXAMPLE 3

5-n-Butyl-5-(3-Sulfolanyl)barbituric Acid

A portion of diethyl α-n-butyl-3-sulfolanylmalonate (10.5 grams) in 40 milliliters of absolute ethanol was heated at reflux temperature for 11 hours with twice the equimolar proportions of each of urea and sodium ethoxide. At the end of the reaction period, the reaction mixture was worked up in the same manner as that described in Example 1, except the product was precipitated from basic solution by the addition of acetic acid. The barbituric acid was recrystallized from 45 percent acetic acid solution. It exhibited a melting range of 253–255° C. and was obtained in 33 percent yield.

EXAMPLE 4

5-Phenyl-5-(3-Sulfolanyl)barbituric Acid

A portion of diethyl α-phenyl-3-sulfolanylmalonate (6.0 grams) in absolute ethanol medium (30 milliliters) was heated at the reflux temperature for 12 hours with twice the equimolar proportion of each of urea and sodium ethoxide. At the end of the reaction period, the reaction mixture was worked up in the same manner as that described in Example 1. The purified barbituric acid product exhibited a melting range of 319–320° C. and was obtained in 45 percent yield.

5-methyl-5-(3-sulfolanyl)barbituric acid, 5-n-propyl-5-(3-sulfolanyl)barbituric acid and 5-isopropyl-5-(3-sulfolanyl)barbituric acid are prepared in a manner similar to that shown in the foregoing examples except that diethyl α-methyl-3-sulfolanyl-malonate, diethyl α-n-propyl-3-sulfolanylmalonate and diethyl α-isopropyl-3-sulfolanylmalonate are used, respectively, instead of the malonic esters in the enumerated examples.

In administering a compound of the invention as an active toxicant for the control of helminths, the compound may be administered in a number of ways, e.g., in daily dosage amounts in gelatin capsules, or the compound may be incorporated in the drinking water or the feed diet of the animal. Feed compositions are generally prepared to contain from about 0.01 to 1 percent by weight of one of the present compounds.

In representative operations, mice naturally infested with tapeworms were fed a diet containing 0.06 percent by weight of 5-(3-sulfolanyl)barbituric acid. At the end of a one-week period, necropsy showed complete clearance of tapeworms.

In further operations, mice naturally infested with pinworms and/or tapeworms were inoculated with larvae of the mouse Trichostrongylid, *N. dubuis,* after being started on a test diet containing 0.06 percent by weight of 5-ethyl-5-(3-sulfolanyl)barbituric acid. The test diet was continued 6 more days. Necropsy findings then showed control of about one-half of the Trichostrongylid larvae.

I claim:
1. A compound having the structural formula

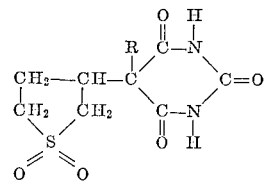

wherein R is a member of the group selected from H, phenyl, and lower alkyl group having 1 to 4 carbon atoms.
2. 5-lower alkyl-5-(3-sulfolanyl)barbituric acid, said lower alkyl group having 1 to 4 carbon atoms.
3. 5-(3-sulfolanyl)barbituric acid.
4. 5-phenyl-5-(3-sulfolanyl)barbituric acid.

References Cited in the file of this patent

Faith et al.: Jour. Org. Chem., vol. 27, pp. 2889–2896, August 1962.